(12) United States Patent
Frederiksen et al.

(10) Patent No.: US 11,500,111 B2
(45) Date of Patent: Nov. 15, 2022

(54) DOPPLER COMPENSATION IN NON-TERRESTRIAL NETWORKS

(71) Applicant: Nokia Technologies Oy, Espoo (FI)

(72) Inventors: Frank Frederiksen, Klarup (DK); Jeroen Wigard, Klarup (DK); Knud Knudsen, Aabybro (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/474,298

(22) Filed: Sep. 14, 2021

(65) Prior Publication Data

US 2022/0091276 A1 Mar. 24, 2022

(30) Foreign Application Priority Data

Sep. 22, 2020 (FI) .................................. 20205916

(51) Int. Cl.
*G01S 19/25* (2010.01)
*G01S 19/29* (2010.01)
*G01S 19/24* (2010.01)

(52) U.S. Cl.
CPC .......... *G01S 19/256* (2013.01); *G01S 19/243* (2013.01); *G01S 19/254* (2013.01); *G01S 19/29* (2013.01)

(58) Field of Classification Search
CPC .... G01S 19/243; G01S 19/254; G01S 19/256; G01S 19/29
See application file for complete search history.

(56) References Cited

U.S. PATENT DOCUMENTS 5,936,961 A 8/1999 Chiodini et al. .............. 370/441

*Primary Examiner* — Dao L Phan
(74) *Attorney, Agent, or Firm* — Harrington & Smith

(57) ABSTRACT

Apparatus and method for communication in non-terrestrial networks are disclosed. A set of Doppler shift curves for different distances to one or more satellite orbits is obtained. Measurements of satellite transmission are performed to obtain estimate of instantaneous Doppler shift of the transmission, the measurements including a timestamp. A Doppler shift curve corresponding to the measurements is calculated. A time offset on the selected curve is determined utilising the timestamps of the measurements, the time offset indicating the position of the Doppler shift of the apparatus on the curve. The Doppler shift of the satellite transmission is determined utilising the selected curve and the time offset.

9 Claims, 5 Drawing Sheets

DOPPLER COMPENSATION IN NON-TERRESTRIAL NETWORKS

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. In additional to traditional cellular communication, non-terrestrial networks may be utilised in communication especially where coverage of land-based access nodes is poor. Designing communication utilising both cellular and non-terrestrial networks is challenging due to different propagation environments.

In non-terrestrial communication, satellites are used to create cells for terminal devices. One of the issues that must be taken into account in such communication is Doppler shift, which is due to the high speed of the satellites.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

An apparatus in a communication system comprising at least one processor; and at least one non-transitory memory including computer program code, the at least one memory and computer program code configured to, with the at least one processor, cause the apparatus to: obtain a set of Doppler shift curves for different distances to one or more satellite orbits; perform measurements of satellite transmission to obtain estimate of instantaneous Doppler shift of the transmission, the measurements comprising a timestamp; calculate a Doppler shift curve corresponding to the measurements; determine a time offset on the curve utilizing the timestamps of the measurements, the time offset indicating position of the Doppler shift of the apparatus on the curve; determine the Doppler shift of the satellite transmission utilizing the curve and the time offset, wherein determining the time offset comprises comparing the measured instantaneous Doppler shift values to the values on the curve and determining the time offset based on the timestamps of the measurements; and apply the determined Doppler shift in receiver operations.

A method including obtaining a set of Doppler shift curves for different distances to one or more satellite orbits; performing measurements of satellite transmission to obtain estimate of instantaneous Doppler shift of the transmission, the measurements comprising a timestamp; calculating a Doppler shift curve corresponding to the measurements; determining a time offset on the curve utilizing the timestamps of the measurements, the time offset indicating position of the Doppler shift of the apparatus on the curve; determining the Doppler shift of the satellite transmission utilizing the curve and the time offset, wherein determining the time offset comprises comparing the measured instantaneous Doppler shift values to the values on the curve and determining the time offset based on the timestamps of the measurements; and applying the determined Doppler shift in receiver operations.

A non-transitory computer readable medium encoded with a computer program comprising instructions for causing an apparatus to at least perform: obtaining a set of Doppler shift curves for different distances to one or more satellite orbits; performing measurements of satellite transmission to obtain estimate of instantaneous Doppler shift of the transmission, the measurements comprising a timestamp; calculating a Doppler shift curve corresponding to the measurements; determining a time offset on the curve utilizing the timestamps of the measurements, the time offset indicating position of the Doppler shift of the apparatus on the curve; determining the Doppler shift of the satellite transmission utilizing the curve and the time offset, wherein determining the time offset comprises comparing the measured instantaneous Doppler shift values to the values on the curve and determining the time offset based on the timestamps of the measurements; and applying the determined Doppler shift in receiver operations.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIG. 1 illustrates an example of simplified system architecture of a communication system;

DESCRIPTION OF SOME EMBODIMENTS

Figure 1:
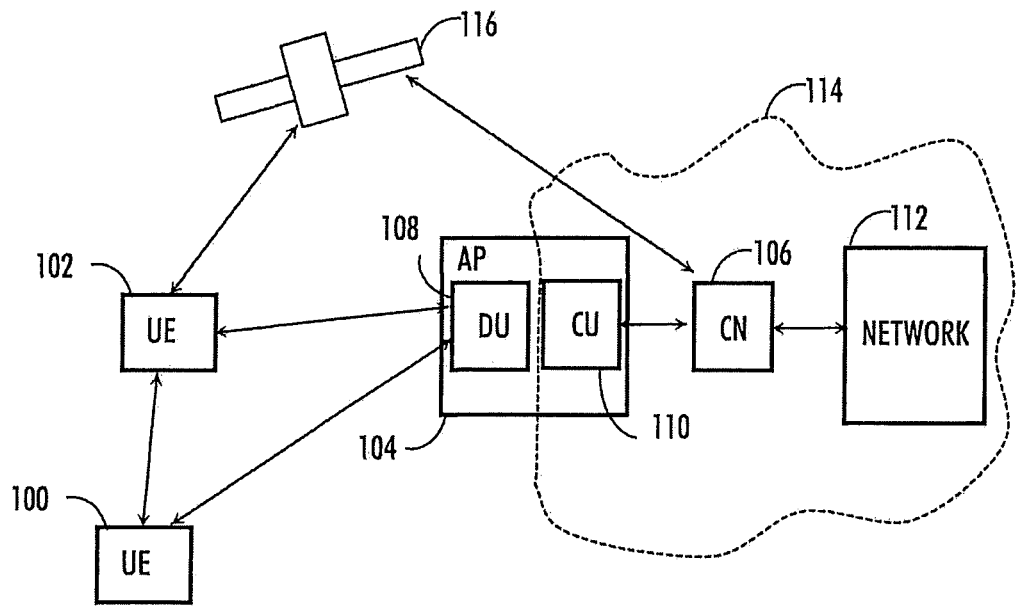

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node, such as (e/g)NodeB, serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication 116 to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In communication involving connections between a terminal device and a satellite node the extreme operating link loss is one of the challenging aspects compared to terrestrial networks where terminal devices communicate with relatively near-by RAN nodes. In NR, it has been proposed that at least some terminal devices may communicate with satellites which may be either Low-Earth Orbit (LEO) or Geosynchronous Equatorial Orbit (GEO) satellites utilising FR1 frequency range.

Terminal devices are typically battery powered devices. Thus, in many situations they have a limited power supply at their use. Therefore, power saving of terminal devices is an important goal in network design. When communicating with a satellite node, the terminal devices may be forced to transmit at high power due to the length of the transmission link and high pathloss. In terrestrial networks long transmission links may be generally avoided by placing RAN nodes in suitable distances from each other. In satellite communication this is not possible because of the high altitude of the satellites.

Figure 2:
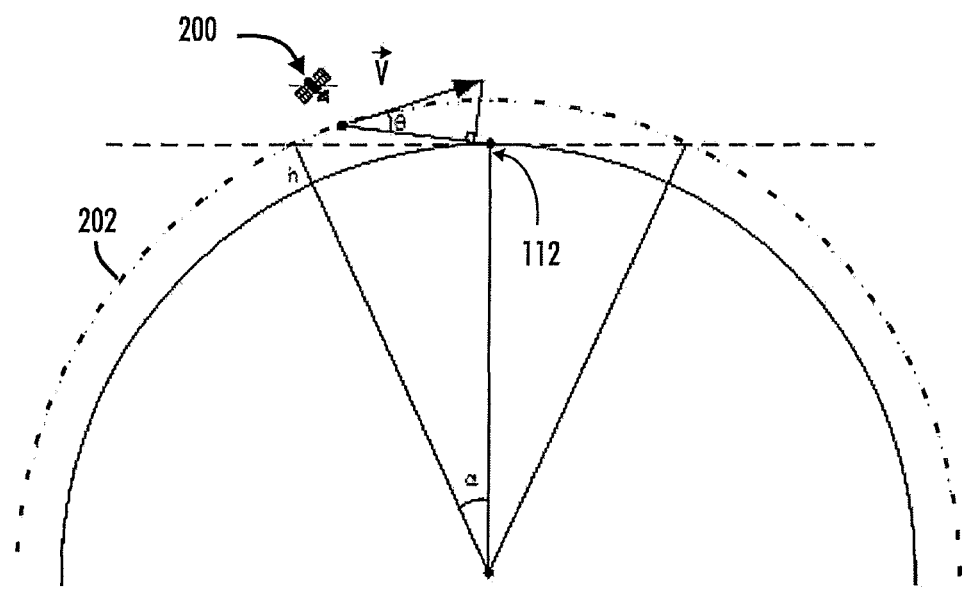
FIG. 2 illustrates an example of a satellite orbit node transmission.

FIG. 2 illustrates an example of non-terrestial-networks NTN. A satellite 200 is used for creating a cell on the ground. Thus, a terminal device 202 communicates directly with the satellite. In an embodiment, the satellite may comprise an (e/g)NodeB. In an embodiment, the (e/g)NodeB is located on the ground and the satellite is acts as an antenna or a transmission point.

Low earth orbit (LEO) satellites have some benefits compared to satellites with higher orbits, because of their lower round trip time (RTT) and lower propagation loss in the communication link. However, the communication link between a LEO satellites and a terminal device suffers from high Doppler shifts and fast variation in the Doppler shift due to the high-speed movement of the satellites. A Doppler shift is the change in carrier frequency caused by the relative speed between the satellite and the terminal device. These Doppler shift issues are a challenge with NTN networks, especially for LEO satellites due to the low orbit altitude.

FIG. 2 illustrates the orbit of a satellite 200 with a dashed circle 202 and the speed vector is indicated by $\vec{V}$. A terminal device 112 is located on the ground.

When the speed vector $\vec{V}$ is projected to a vector pointing from the satellite to the terminal device 112, the relative speed of the satellite seen by the terminal device UE can be determined as $\vec{V}relative=\vec{V}*\cos(\theta)$ and the Doppler shift can be calculated as $$f_{doppler} = \frac{|\vec{V}relative|}{c} * f = \frac{|\vec{V}|}{c} * \cos(\theta) * f \quad (1)$$

where c is the speed of light and the θ is the angle between the speed vector and the vector pointing from the satellite to the terminal device. The possible speed of the terminal device is ignored here.

Figure 3:
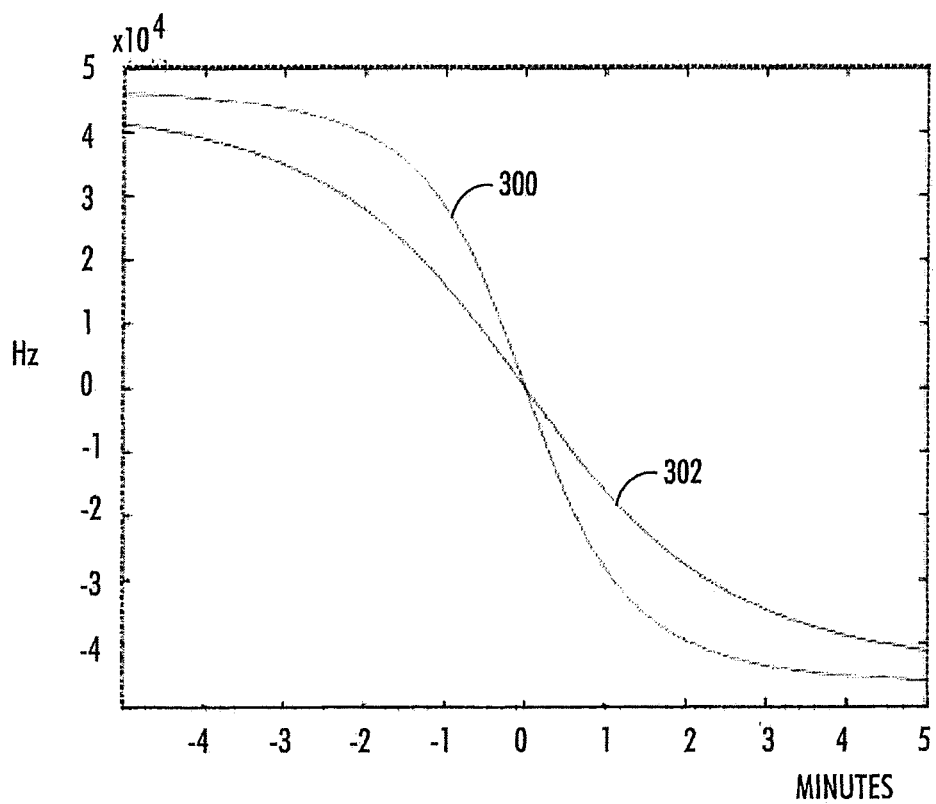
FIG. 3 illustrates an example of Doppler curves.

FIG. 3 illustrates an example where the Doppler shift observed by a stationary terminal device is plotted for two cases. First 300 is where the terminal device is directly below the satellite orbit and second 302 where the terminal device has been moved 1000 km perpendicular to the satellite orbit. The absolute level of the Doppler shift is lower, when the terminal device is not directly under the orbit and in addition the maximum absolute slope is also less.

It may be noted that even if a terminal device is stationary, the relative position of the terminal device to the satellite orbits will change since the earth is rotating while the satellite orbits are not rotating with it. The maximum speed due to earth's rotation for a stationary device at equator is approximately 460 meters per second, so a terminal device may be seen as moving rapidly away from one orbit and towards another orbit.

To reduce the number of satellites required to cover all areas on earth, one satellite may broadcast multiple cells both along the orbit but also with a little displacement compared to the orbit. For Earth Fixed Cells, the serving satellite will change over time and this will cause a jump in the Doppler shift since the new satellite may be on another orbit or it may be time shifted on the same orbit. As the satellite changes, the angle θ in Eq. 1 changes instantaneously causing the jump in Doppler shift.

In a terrestrial network, the Doppler shift occurs due to the mobility of the terminal devices. A worst-case Doppler shift use case defined in the LTE specifications is with high speed trains moving at 500 km/h and a carrier frequency of 2 GHz. This use case results in a maximum Doppler shift of ~950 Hz. As shown in FIG. 3, for NTN networks the Doppler shift will often be much higher than the Doppler shift observed in the high-speed train use case. This is problem as the terminal device may not be able to do the initial synchronization on the satellite unless some a priori knowledge about the expected Doppler shift is provided to the terminal device.

The problem with high Doppler shift and sudden jump in Doppler shift is recognized by standardization organisation 3GPP and some mitigation strategies have been proposed. It has been suggested to provide the terminal device with at least some ephemeris data, which can be used to calculate the orbit plane as well as the satellite position in the orbit plane. Further it has been suggested that the ephemeris data of the neighbouring satellites can also be provided to UE via system information or dedicated Radio Resource Control (RRC) signalling.

The suggested solution of terminal device in the standard using ephemeris data requires that the terminal device has knowledge about its own location. This may be obtained using Global Navigation Satellite System, GNSS, such as Global Positioning System, GPS, Galileo, or Glonass, for example. This causes additional power consumption compared to normal terrestrial operation and in addition the terminal device has to perform a number of floating-point operations per satellite and orbit plane, which also consumes power and takes time.

Figure 4:
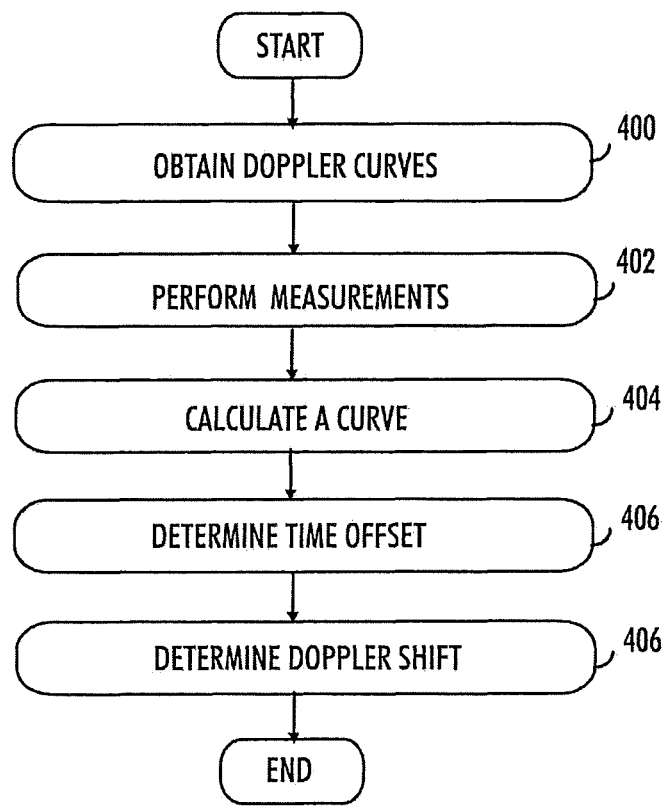
FIG. 4 is a flowchart illustrating an embodiment.

The flowchart of FIG. 4 illustrates an embodiment. The flowchart illustrates an example of the operation of an apparatus. In an embodiment, the apparatus may be a terminal device, user equipment, a part of a terminal device or any other apparatus capable of executing following steps.

In step 400, the apparatus is configured to obtain a set of Doppler shift curves for different distances to the satellite orbit.

In step 402, the apparatus is configured to perform measurements of satellite transmission to obtain estimate of instantaneous Doppler shift of the transmission, the measurements comprising a timestamp.

In step 404, the apparatus is configured to calculate a Doppler shift curve corresponding to the measurements;

In step 406, the apparatus is configured to determine a time offset on the selected curve utilising the timestamps of the measurements, the time offset indicating the position of the Doppler shift of the apparatus on the curve;

In step 408, the apparatus is configured to determine the Doppler shift of the satellite transmission utilising the selected curve and the time offset.

In an embodiment, the apparatus or terminal device is configured to apply the determined Doppler shift in receiver operations. The receiver operations may be data reception and neighbor cell measurements, for example to name a few.

In an embodiment, the apparatus or terminal device is configured to determine Doppler shift for the transmissions of one or more satellites serving one or more neighbouring cells.

Figure 5:
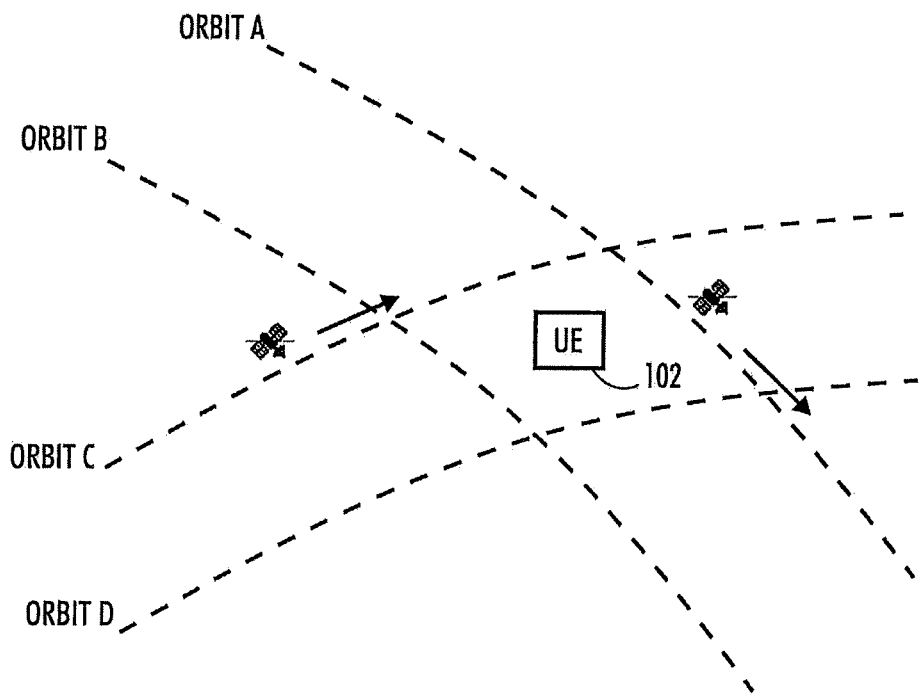
FIG. 5 illustrates example related to satellite orbits.

The terminal device may be able to learn the Doppler shift curves for multiple orbits, since the terminal device may have to perform neighbour cell measurements on other orbits than the orbit followed by the serving cell satellite. The example of FIG. 5 illustrates a situation where the serving cell of the terminal device 112 is broadcasted by a satellite on orbit A and a neighbour cell is broadcasted by a satellite on orbit C. The terminal device may be configured to perform measurement from satellites of all orbits A, B. C and D. The figure shows only the 4 closest orbits, but the terminal device could learn additional orbits if required.

Figure 6A:
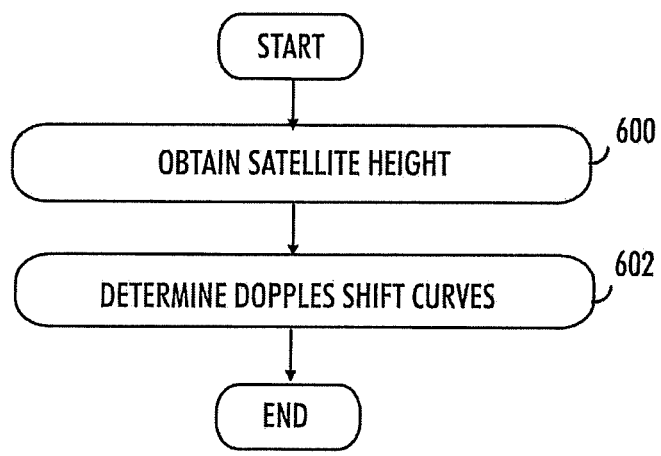
FIGS. 6A and 6B are flowcharts illustrating embodiments.
Figure 6B:
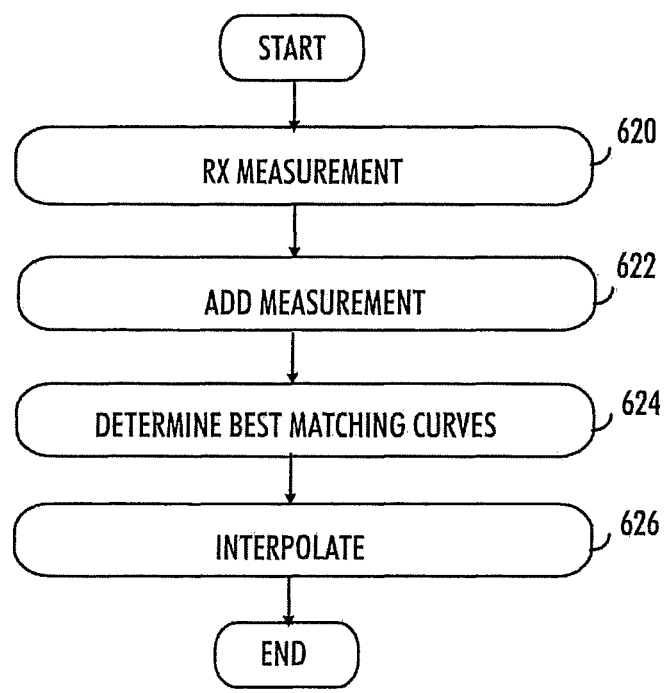

The flowcharts of FIGS. 6A and 6B illustrate an embodiment. The flowchart illustrates an example of the operation of an apparatus when it learns satellite orbit characterization from receiver-based measurements performed by the apparatus. In an embodiment, the apparatus may be a terminal device, user equipment, a part of a terminal device or any other apparatus capable of executing following steps. The figures illustrate an example In step 600 of FIG. 6A, the apparatus is configured to obtain height of the satellite orbit. In an embodiment, the height may be included in the ephemeris data received by the apparatus or it may be prestored configuration information on the USIM or in the memory of the apparatus.

In step 602, the apparatus is configured calculate a set of Doppler shift curves for different perpendicular distances from the apparatus to the position right below the orbit.

The satellite speed may be calculated utilising the equation $$v_{satellite} = \sqrt{\frac{G \cdot M}{R + h}} \quad (2)$$

where G is the universal constant of gravitation, and M is the mass of the Earth, R is the radius of Earth and h is the orbit height. Knowing the speed of the satellite as well as the height means that the position of the satellite in the orbit plane can be calculated, when defining that time 0 is the position at which the satellite is directly at zenith. To calculate the Doppler shift observed by a terminal device, the relative speed $\vec{V}$relative of the satellite is needed. It is found by projecting the satellite speed onto the vector pointing from the satellite to the UE. Next the Doppler shift is calculated as:

$$f_{doppler} = \frac{|\vec{V}relative|}{c} * f \quad (3)$$

Figure 7:
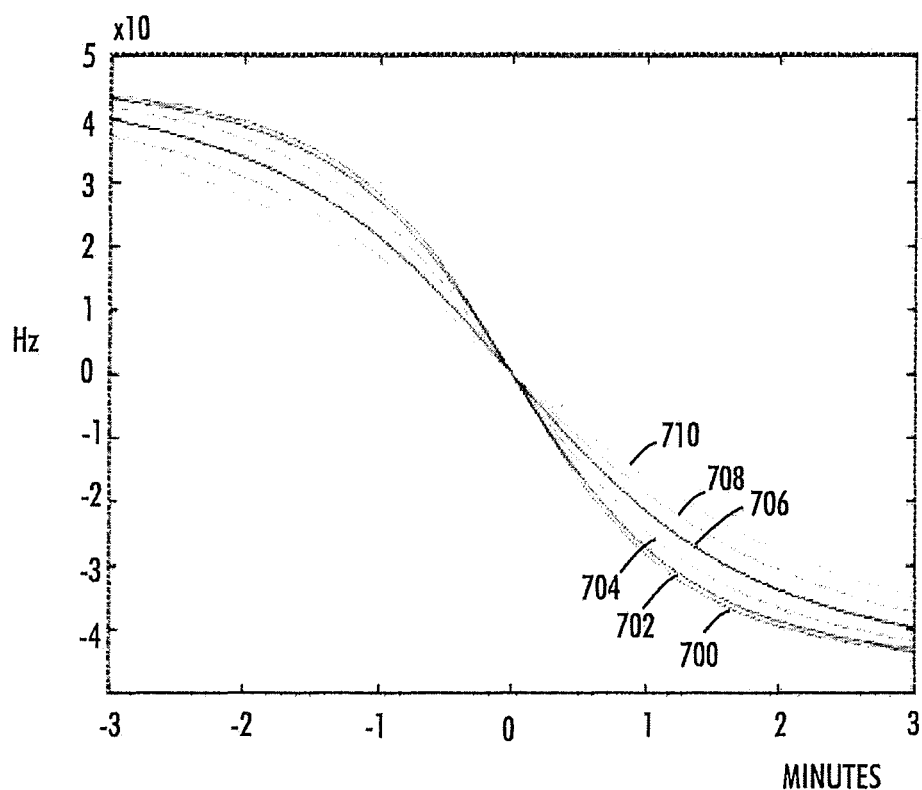
FIG. 7 illustrates an example of Doppler curves.

FIG. 7 illustrates an example where the Doppler shift has been calculated as a function of time for different terminal device positions relative to the orbit. The terminal device position has been offset perpendicular to the orbit plane and for each offset, in steps of 200 km, the Doppler shift curve has been calculated. The figure illustrates the Doppler shift at distance at position below the orbit 700, and ground distances 200, 400, 600, 800 and 1000 km from the orbit

702, 704, 706, 708 and 710 correspondingly. Distances beyond 1000 km to the orbit plane gives a poor link budget, so this is the reason for the limit of terminal device offset, but of course the calculations could have been done also for bigger offsets.

Calculating the set of Doppler shift curves is a one-time task for a given orbit height. The Doppler shifts only change if the orbit height changes.

Satellites in the same orbit will result in the same Doppler shift curve if the terminal device does not move. In a situation where the terminal device moves perpendicular to the orbit plane this will result in movement towards another Doppler shift curve.

In step 620 of FIG. 6B, the apparatus is configured to perform measurements of satellite transmission to obtain estimate of instantaneous Doppler shift of the transmission, the measurements comprising a timestamp. The terminal devices are performing measurements of the network node they are connected to and also of surrounding nodes. The measurements may comprise Reference Signal Received Power, RSRP and Reference Signal Received Quality, RSRQ measurements, for example. In prior art, these measurements are used in making handover decisions, for example. The terminal device is able to estimate Doppler shift of the received signals based on the measurements.

In step 622 of FIG. 6B, the apparatus is configured to store or add the measurement for the actual Doppler shift recordings associated with the satellite and orbit which broadcasts the cell. Thus, data regarding the satellite transmission is gathered. The apparatus shall map the measurement to the satellite broadcasting the cell as well as the orbit which the satellite is following.

As mentioned, the apparatus may receive from network some ephemeris data which allows the apparatus to map cells to an orbit (and associated data) at a given time. This mapping is independent of the apparatus position and can therefore be used, without requiring GNSS information.

The Doppler shift curves for the different satellites on the same orbit is identical as long as the apparatus is not moving position, therefore if multiple satellites from the same orbit are received and if the time shift of the satellites is known, then the measurement from all satellites can be combined to faster learn the Doppler shift curve.

When several measurements have been recorded for an orbit/satellite, the apparatus, in step 624, is able to select two closest Doppler shift curves from the precalculated set of Doppler curves based on the measurements.

In an embodiment, to find the closest curves, the apparatus may evaluate a combination of the absolute level of the measured Doppler shifts as well as the change in Doppler shift between the measurements.

In an embodiment, the detection of the closest precalculated Doppler curves can be repeated whenever more measurements are available to increase confidence is the matching. This may also be needed since the distance of the apparatus to the orbit changes over time. This may happen as earth is rotating and the orbit planes are not. So even a stationary apparatus will move relative to the orbits and a stationary apparatus staying on the same Earth Fixed Cell, will therefore eventually observe that the broadcast of the cell moves from one orbit to another resulting in a sudden change of the Doppler shift.

In an embodiment, the apparatus can keep track of the best matching Doppler curves over time for each orbit. This can be used to detect how fast the apparatus is moving relative to the orbit plane and it may be used to predict the closest Doppler shift curve for an upcoming satellite even if there are no recent measurements on the orbit.

In step 626 of FIG. 6B, the apparatus is configured to interpolate between the selected closest curves to obtain the Doppler curve corresponding to the measurements. When the closest matching curves have been identified, the actual curve may be found by a simple linear interpolation between the on the two curves. Naturally, also other interpolation or extrapolation methods may be utilised. The resulting curve can then be used to predict the Doppler shift during the communication with the satellite.

If the cell moves from one satellite to another in the same orbit plane, or if a neighbor cell measurement is to be performed on the next satellite in the same orbit plane, then the acquired Doppler shift curve can also be used, however with a time shift. In an embodiment, the network may inform the apparatus about the time difference (time shift) between the satellites in the same orbit (either implicitly through the ephemeris data, or through direct indication of the time delay between satellites in the same orbit). In addition, the network may inform the apparatus about the orbit, which is broadcasting the cell, such that the apparatus can identify if a recent Doppler shift curve is acquired for the orbit.

Figure 8:
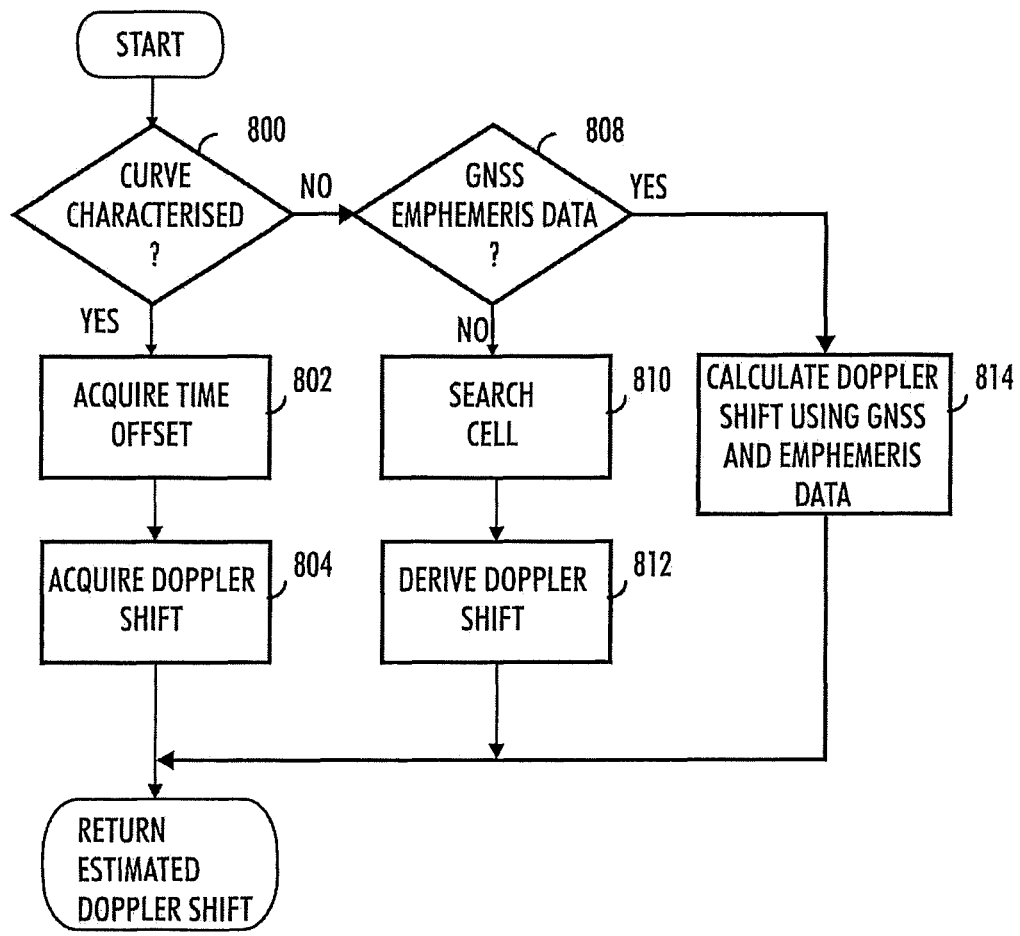
FIG. 8 is a flowchart illustrating an embodiment.

The flowchart of FIG. 8 illustrates an embodiment. The flowchart illustrates an example of the operation of the apparatus when it estimates the expected Doppler shift of a satellite transmission. In the flow chart there are three paths to derive an estimate of the expected Doppler shift. First path is used when the apparatus has characterization of the orbit, second when the apparatus has no characterization of the orbit but has ephemeris data and position information and the third path is used when the apparatus has no characterization of the orbit and no ephemeris data and position information.

In step 800 of FIG. 8, the apparatus is configured to determine whether the cell to receive belongs to an orbit which has already been characterized, meaning that the apparatus can derive the Doppler shift estimation from this information.

As mentioned, the apparatus or terminal device is constantly moving relative to the orbits due to the rotation of earth. Therefore, before the reception of a cell, the apparatus is first configured to determine from which satellite and orbit the cell is broadcasted from at the time of reception.

The apparatus is configured to check if the orbit of the satellite is already characterized and use this information to decide the reception operation. In an embodiment, the apparatus may maintain orbit characterization data for multiple orbits, at least the orbits closest to the apparatus in all directions.

If the Doppler shift curve of the orbit is learned (as illustrated above in FIGS. 6A and 6B) or the learning of the Doppler shift curve is still ongoing, but there are sufficient recorded measurements to do short term extrapolation of the curve, the apparatus is configured to, in step 802, acquire time offset of cell on Doppler shift curve.

If the learning of the Doppler shift curve is still ongoing, and there are recent Doppler shift measurements a simple linear extrapolation can be used to obtain the Doppler shift curve. If the extrapolation uses older measurements e.g. for neighbour cell measurements a 2nd order polynomial extrapolation may perform better as it can adapt to the nonlinear Doppler shift curves. As the Doppler shift curves are quite smooth, such an extrapolation will be able to give a good fit for a longer duration. It should be noted that other form of extrapolation methods may also be used.

The recorded measurement data used for the learning procedure contain a timestamp of when the measurement was performed. Therefore, when detecting the best matching Doppler curve of the precalculated set of Doppler curves, these timestamps can be used to determine the time offset of the curve for the current satellite. In an embodiment, determining the time offset comprises comparing the measured instantaneous Doppler shift values to the values on the selected curve and determining the time offset based on the timestamps of the measurements.

In step 804 of FIG. 8, the apparatus is configured to acquire Doppler shift from Doppler curve data and time offset. When the time offset is found, the Doppler shift is found by looking up the corresponding value in the learned, estimated or pre-calculated Doppler shift curve.

If the orbit of the satellite is not characterized and there are not enough measurements, the apparatus is configured to determine in step 808 whether the apparatus has GNSS support or coverage and ephemeris data. There may be situations where even if the apparatus has GNSS support, it may have chosen to disable this for power saving purposes, or it may not be available in the current environment.

If the apparatus does not have GNSS support/coverage or do not have ephemeris data, the apparatus cannot calculate the actual Doppler shift it may instead choose to start learning the Doppler shift curve for the orbit in step 810. Steps 810 and 812 are the second path where the apparatus has no prior knowledge of the cell and orbit to use for the Doppler shift estimation.

In step 810, the apparatus has no a priori knowledge about the orbit, except height of orbit and satellite speed. This is sufficient information only to obtain the Doppler shift curve of FIG. 3. which shows a worst-case Doppler shift of about 46 kHz for a stationary apparatus. For higher orbits, the worst-case Doppler shift becomes lower.

The initial synchronisation on cells is assumed to most likely happen while the satellite is approaching. This means that the apparatus will try to synchronise to a cell broadcasted by a satellite on the left side of the simulated Doppler curve of FIG. 3, since this is representing the side with positive Doppler shift indicating that the satellite is approaching the apparatus.

The apparatus will search the cell/satellite by sweeping over different frequency offsets. In an embodiment, the apparatus may be configured to choose to search for the satellite with different frequency offsets applied, with approximately +46 kHz as the upper boundary and approximately −46 kHz as lower boundary. The boundaries may be extended a bit so support apparatus Doppler shift (due to apparatus movement and local oscillator inaccuracies) to be added, but this is assumed to be at maximum 2 kHz. The search may start from the most positive value and downwards to exploit the knowledge that an approaching satellite will have a high positive Doppler shift.

In step 812 of FIG. 8, the apparatus is configured to determine the Doppler shift of the cell. The determining of the Doppler shift of the cell may be stored for later use. The carrier frequency of the synchronisation signal block, SSB, needs to fit on the frequency raster defined by the Global Synchronization Channel Number, GSCN. When an SSB is found it may be an invalid channel number, since the carrier has been shifted by the Doppler offset. Therefore, the actual Doppler shift may be found by assuming that the SSB was transmitted on the carrier frequency matching the closest valid GSCN.

If the apparatus has GNSS support/coverage and ephemeris data, it is able to determine its location and, in step 814, it can calculate the actual Doppler shift as well as the distance of the apparatus to the orbit and time shift of Doppler curve and give all this as input to the learning procedure illustrated in FIGS. 6A and 6B in section 6.1. The learning procedure can then derive the actual Doppler shift curve to use for the satellite during the rest of the overfly.

Figure 9:
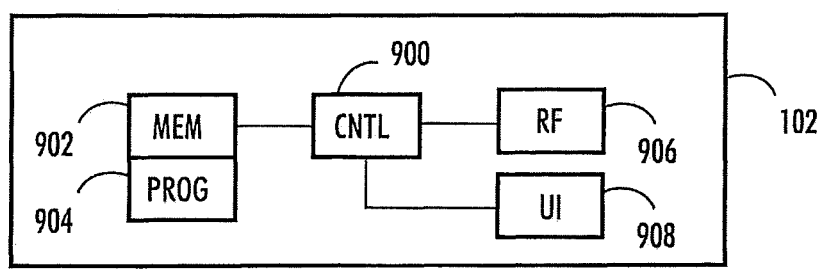
FIG. 9 illustrates an example of an apparatus.

FIG. 9 illustrates an embodiment. The figure illustrates a simplified example of an apparatus applying embodiments of the invention. In some embodiments, the apparatus may be a terminal device 102, or a part of a terminal device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 102 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus may comprise one or more interface circuitries 906, 908. The interface circuitries are operationally connected to the control circuitry 900. An interface circuitry 906 may be a set of transceivers configured to communicate with a RAN node, such as an (e/g)NodeB of a wireless communication network or a satellite node. The interface circuitry may be connected to an antenna arrangement (not shown). The apparatus may also comprise a connection to a transmitter instead of a transceiver. The apparatus may further comprise a user interface 908.

In an embodiment, the software 904 may comprise a computer program comprising program code means adapted to cause the control circuitry 900 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises means for obtaining a set of Doppler shift curves for different distances to one or more satellite orbits; performing measurements of satellite transmission to obtain estimate of instantaneous Doppler shift of the transmission, the measurements comprising a timestamp; calculating a Doppler shift curve corresponding to the measurements; determining a time offset on the selected curve utilising the timestamps of the measurements, the time offset indicating the position of the Doppler shift of the apparatus on the curve and for determining the Doppler shift of the satellite transmission utilising the selected curve and the time offset.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system comprising at least one processor; and at least one non-transitory memory including computer program code, the at least one memory and computer program code configured to, with the at least one processor, cause the apparatus to perform:
    obtain a set of Doppler shift curves for different distances to one or more satellite orbits;
    perform measurements of satellite transmission to obtain estimate of instantaneous Doppler shift of the transmission, the measurements comprising a timestamp;
    calculate a Doppler shift curve corresponding to the measurements;
    determine a time offset on the curve utilising the timestamps of the measurements, the time offset indicating position of the Doppler shift of the apparatus on the curve;
    determine the Doppler shift of the satellite transmission utilising the curve and the time offset, wherein determining the time offset comprises comparing the measured instantaneous Doppler shift values to the values on the curve and determining the time offset based on the timestamps of the measurements; and
    apply the determined Doppler shift in receiver operations.

2. The apparatus of claim 1, wherein the at least one memory and the computer program code are configured to, with the at least one processor, cause the apparatus further to perform:
    calculate a Doppler shift curve corresponding to the measurements by
    selecting two closest Doppler shift curves from the set of curves based on the measurements;
    interpolate between the selected two closest Doppler shift curves to obtain the curve corresponding to the measurements.

3. The apparatus of claim 1, wherein the at least one memory and the computer program code are configured to, with the at least one processor, cause the apparatus further to perform:
    determine Doppler shift for the transmission of the satellite serving a cell the apparatus is connected to.

4. The apparatus of claim 1, wherein the at least one memory and the computer program code are configured to, with the at least one processor, cause the apparatus further to perform:
    determine Doppler shift for the transmissions of one or more satellites serving one or more neighbouring cells.

5. A method in an apparatus in a communication system comprising:
    obtaining a set of Doppler shift curves for different distances to one or more satellite orbits;
    performing measurements of satellite transmission to obtain estimate of instantaneous Doppler shift of the transmission, the measurements comprising a timestamp;
    calculating a Doppler shift curve corresponding to the measurements;
    determining a time offset on the curve utilising the timestamps of the measurements, the time offset indicating position of the Doppler shift of the apparatus on the curve;
    determining the Doppler shift of the satellite transmission utilising the curve and the time offset, wherein determining the time offset comprises comparing the measured instantaneous Doppler shift values to the values on the curve and determining the time offset based on the timestamps of the measurements; and
    applying the determined Doppler shift in receiver operations.

6. The method of claim 5, further comprising:
calculating a Doppler shift curve corresponding to the measurements by
selecting two closest Doppler shift curves from the set of curves based on the measurements;
interpolate between the selected two closest Doppler shift curves to obtain the curve corresponding to the measurements.

7. The method of claim 5, further comprising:
determining Doppler shift for the transmission of the satellite serving a cell the apparatus is connected to.

8. The method of claim 5, further comprising:
determining Doppler shift for the transmissions of one or more satellites serving one or more neighbouring cells.

9. A non-transitory computer readable medium encoded with a computer program comprising instructions for causing an apparatus to at least perform:
obtaining a set of Doppler shift curves for different distances to one or more satellite orbits;
performing measurements of satellite transmission to obtain estimate of instantaneous Doppler shift of the transmission, the measurements comprising a timestamp;
calculating a Doppler shift curve corresponding to the measurements;
determining a time offset on the curve utilising the timestamps of the measurements, the time offset indicating position of the Doppler shift of the apparatus on the curve;
determining the Doppler shift of the satellite transmission utilising the curve and the time offset, wherein determining the time offset comprises comparing the measured instantaneous Doppler shift values to the values on the curve and determining the time offset based on the timestamps of the measurements; and
applying the determined Doppler shift in receiver operations.

* * * * *